No. 782,276. PATENTED FEB. 14, 1905.
K. G. ROEBLING.
OILING DEVICE FOR CHAIN WHEELS.
APPLICATION FILED OCT. 14, 1904.
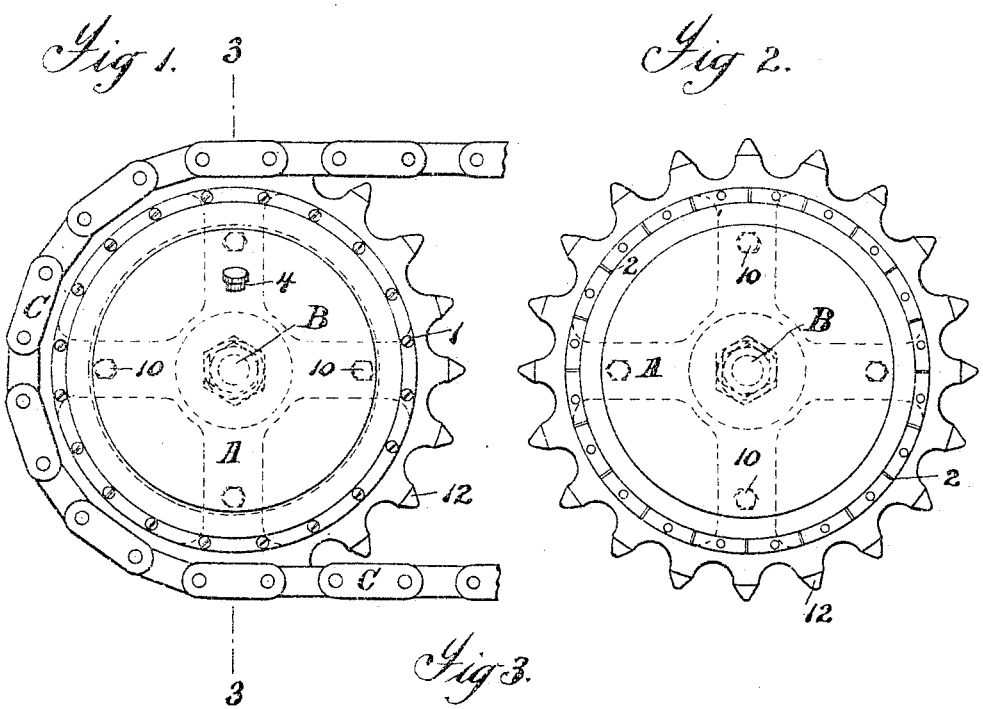
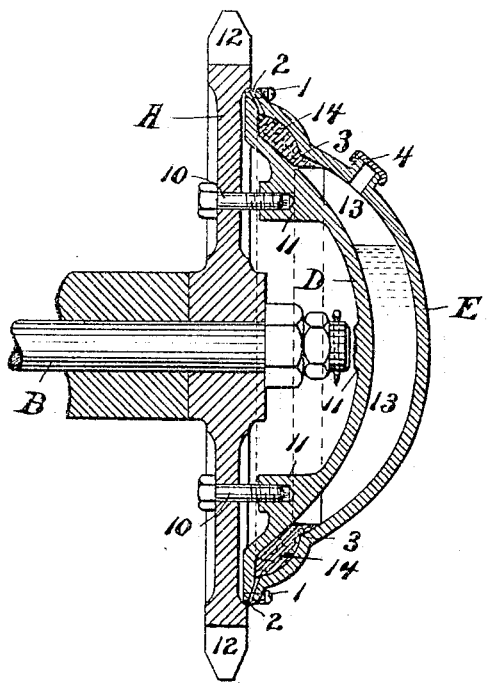

No. 782,276. Patented February 14, 1905.

UNITED STATES PATENT OFFICE.

KARL G. ROEBLING, OF TRENTON, NEW JERSEY.

OILING DEVICE FOR CHAIN-WHEELS.

SPECIFICATION forming part of Letters Patent No. 782,276, dated February 14, 1905.

Application filed October 14, 1904. Serial No. 228,390.

*To all whom it may concern:*

Be it known that I, KARL G. ROEBLING, a citizen of the United States, residing at Trenton, county of Mercer, and State of New Jersey, have invented certain new and useful Improvements in Oiling Devices for Chain-Wheels and the Like, fully described and represented in the following specification and the accompanying drawings, forming a part of the same.

The especial object of the present invention is to provide a simple, convenient, and efficient means for oiling the chains of outside-driving automobiles; but the invention is applicable also for oiling driving-chains or the like in other machines.

In outside-driving automobiles, in which the sprocket-wheels and driving-chains are nearly in line with the wheels, great difficulty has been found in keeping the driving-chains in running condition on account of the dust and fine sand thrown up by the wheels. The present invention provides efficient means for constantly applying a very small quantity of oil to the chains, so as to keep them oiled and in proper running condition, while at the same time avoiding the objections incident to the application of any considerable quantity of oil, while adding to the automobile only a light detachable device which is not liable to damage in use and does not injure the appearance of the machine.

In the accompanying drawings, forming a part of this specification, the invention is illustrated as applied in its preferred form to a sprocket-wheel and driving-chain of a common type, and this construction will now be described in detail and the features forming the invention specifically pointed out in the claims.

In the drawings, Figure 1 is a side view of the oiling device looking to the left in Fig. 3. Fig. 2 is a similar view with the outer plate of the oil-chamber removed. Fig. 3 is a section on the line 3 of Fig. 1 without the driving-chain.

Referring to the said drawings, A is the sprocket-wheel, B the sprocket-shaft, on which the sprocket-wheel may be secured in any suitable manner, being shown as secured by the usual nuts and cotter-pin, and C is the driving-chain running on the sprocket-wheel. On the outer side of the sprocket-wheel is secured by screws 10 an oil-chamber which is formed of the two plates D E. The plate D is shown as a concave disk covering most of the sprocket-wheel and the end of the shaft B and secured to the sprocket-wheel by the screws 10, entering lugs 11 on the plate, and the outer edge of this plate D extends to near the bases of the teeth 12 on the sprocket-wheel. The outer plate E consists in the form shown of a disk of the same circumference as the disk D, and the edges of the disks D, fit closely together; but the disk E is formed so as to provide an oil-chamber 13 between the disks. The concave form of the plates D E accommodates the end of the shaft B and the nuts thereon, and the disk form provides a cover for them; but it will be understood that this form of the plates and oil-chamber is not essential, although preferred, it being necessary only that annular plates shall be used to form an annular oil-chamber, so as to force the oil outward from the oil-chamber between the edges of the plates by centrifugal force. The edges of the disks D E are secured together by screws 1, passing through the edge of the disk E and into the disk D, so as to hold the disk E in place and close the outer edge of the oil-chamber; but the slow passage of oil to the face of the sprocket-wheel between the edges of the disks D E is provided for by small oil-passages 2, which are preferably formed by file-marks or similar very small grooves in the face of one of the disks.

A ring of felt or similar absorbent material 14 is preferably used in the outer portion of the oil-chamber 13 to secure the slow passage of the oil to and through the oil-passages 2, and the disk E may be formed so as to provide a shoulder 3, by which the ring is held in place, if desired. The disk E is provided with a filling-opening for pouring in oil, shown as closed by the usual screw-cap 4.

In the operation of the device the oil in chamber 13 will be thrown outward by centrifugal force as the sprocket-wheel and oil-chamber rotate, and the oil thus forced through the absorbent ring 14 and slowly through the small oil-passages 2 and outward on the face of the sprocket-wheel, thus supplying oil to and between the teeth of the sprocket-wheel and efficiently oiling the chain. It is found in practice that with this oiling device the chain will be kept efficiently oiled for many miles with a small quantity of oil, so that even a small oil-chamber requires filling but seldom. If desired, however, an automatic oil-feed with its oil-supply supported on any suitable part of the machine may be used to supply oil to the chamber 13.

What I claim is—

1. The combination with a wheel, of an oiling device consisting of an annular plate secured on the side of the wheel, a second annular plate secured to the first-mentioned plate with a space between the plates forming an oil-chamber, there being small oil-passages between the edges of the plates for the passage of oil from the chamber to the wheel.

2. The combination with a wheel, of an oiling device consisting of an annular plate secured on the side of the wheel, a second annular plate secured to the first-mentioned plate with a space between the plates forming an oil-chamber, there being small oil-passages between the edges of the plates for the passage of oil from the chamber to the wheel, and felt or other absorbent material in said chamber.

3. The combination with the sprocket-wheel A, of the disk D secured thereon, disk E having its edges in contact with the edges of the disk A and formed to provide an oil-chamber between the disks, screws 1 securing the edges of the disks together, there being small oil-passages 2 between the edges of the disks.

In testimony whereof I have hereunto set my hand in the presence of two subscribing witnesses.

KARL G. ROEBLING.

Witnesses:
A. KUGLER,
M. K. ZISGEN.